March 3, 1964 J. V. BORDEN 3,123,338
FLOATING CAPSULE FOR DENTAL HANDPIECE
Filed May 26, 1959
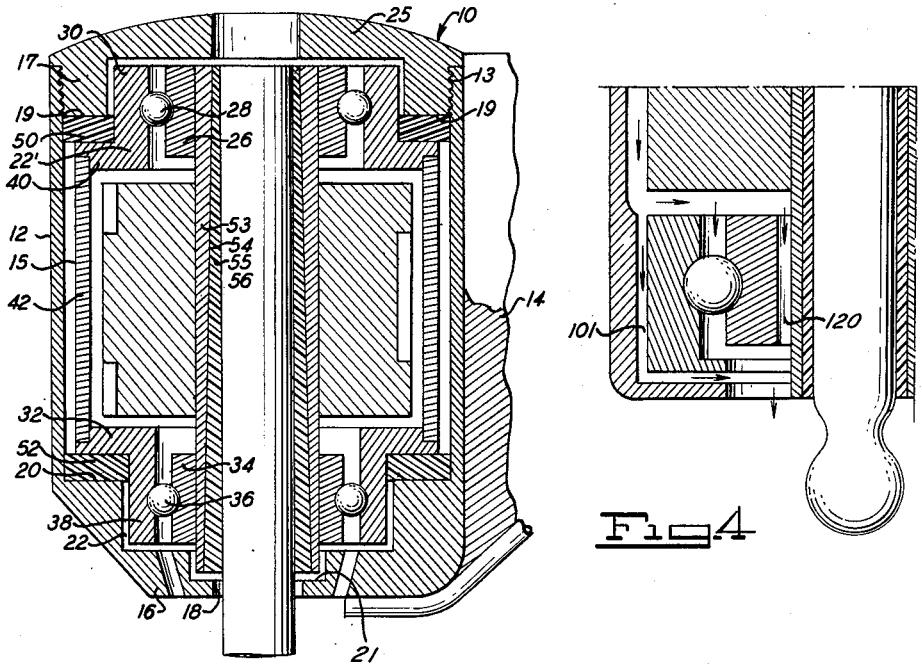
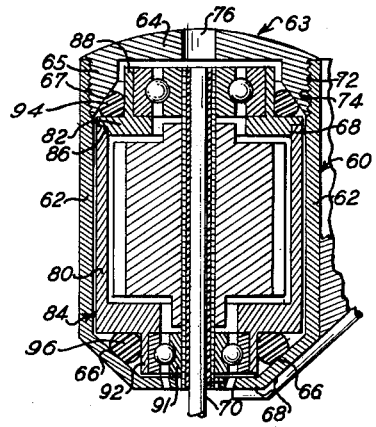
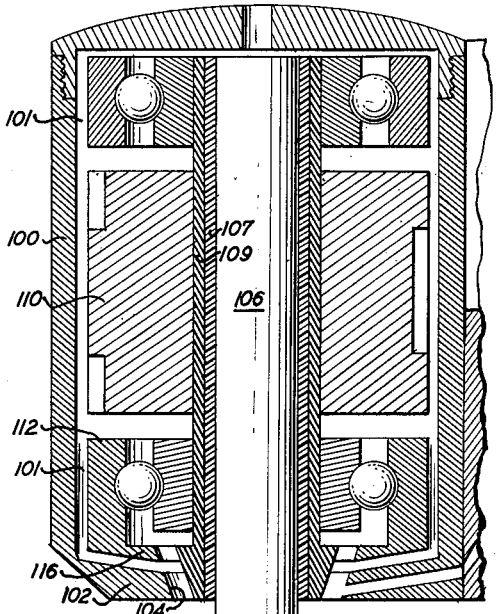
INVENTOR
JOHN V. BORDEN
BY *Fisher, Christen & Goodson*
ATTORNEYS

United States Patent Office 3,123,338
Patented Mar. 3, 1964

3,123,338
FLOATING CAPSULE FOR DENTAL HANDPIECE
John V. Borden, Ranson, W. Va.
Filed May 26, 1959, Ser. No. 815,884
4 Claims. (Cl. 253—2)

This invention relates to dental drills, and particularly to those dental drills employing an air-driven turbine. In dental handpieces of this type, the high speeds at which the rotor is driven are sometimes the cause of unpleasant noise. The structure of this invention provides as its main objective the reduction of this noise by effectively isolating the rotating parts from the hand piece housing.

This main objective is accomplished by providing cushion means between the rotating elements, or the capsule housing when a capsule is used, and the cylindrical casing of the handpiece. In some forms of the invention, this cushion is provided by a film of compressed air, and in others, the cushion or isolating effect is accomplished through the use of uniquely shaped bearings, used in conjunction with a resilient mounting bushing. In still another, it is accomplished through the structure of a uniquely shaped capsule housing and several O-rings.

A further objective of this invention is in the provision of a capsule which does not have its supporting ball bearings compressed in the housing. This freedom from compression results in a longer bearing life.

A still further objective of this invention is in the provision of a capsule having a thin cylindrical casing joining the ball bearings, which arrangement permits the use of a larger air turbine.

Another objective of the invention is to provide a turbine capsule which needs no alignment when inserted into the handpiece.

Further objectives and advantages of this invention will be apparent from the following description and claims wherein the construction, arrangement and cooperation of the several parts of the handpiece are set forth.

In the drawings:

FIG. 1 is a cross-sectional view of one form of the handpiece having a resilient mounting means;

FIG. 2 is a cross-sectional view showing a handpiece of this type having a different resilient mounting means;

FIG. 3 is a cross-sectional view showing the ball bearing units suspended on a film of air; and FIG. 4 is a partial cross-sectional view showing the ball bearing units completely supported by an air film.

Referring to FIG. 1, the numeral 10 designates a handpiece comprised generally of a cylindrical housing 12 and a handle 14 extending therefrom. The housing 12 is open and screw-threaded at one end 13. Adapted to close the housing is the screw-threaded mating cap 15. The cap 15 is threaded on the outside surface of the annular flange 17 which is of a substantial thickness and presents an interior bearing step 19 to the housing. At the other or lower end of the housing is bottom wall 16. Centrally disposed in the bottom wall is the burr shaft receiving opening 18. The interior surface of the bottom wall 16 is formed with a bearing step 20.

Adapted to lie between bearing steps 19 and 20 is capsule 15 having at its upper and lower ends, ball bearing members 22 and 22'. Upper bearing 22' is comprised of inner race 26, ball bearings 28 and outer race 30. Lower bearing 22 consists of inner race 34, the ball bearings 36 and outer race 38. Note that outer races 30 and 38 have outwardly extending flanges 32 and 40 extending therefrom. A cylindrical tubing element 42 is adapted to connect the flanges 32 and 40 at connecting grooves 44 and 48, which are formed in the flanges 32 and 40 respectively.

The annular mounting bushings 50 and 52 are adapted to isolate the capsule from the housing by resiliently supporting the capsule through flanges 32 and 40. These resilient bushings have their inner circumference adjacent the outer periphery of the longitudinally extending portions of the races of bearings 20 and 22. Bushing 50 is positioned between the step 19 and the flange 32, and the bushing 52 is positioned between the flange 40 and the step 20.

It can be seen that the above structure resiliently isolates the capsule itself from the capsule housing. The capsule is also easily placed in the housing by first inserting the annular bushing 52 through the top of the casing, then inserting the capsule, then inserting the annular bearing 50, and finally screwing the top 15 into position. This arrangement transmits only a minimum of inwardly directed pressure to the ball bearings. The arrangement also does not interfere with the normal exhaust channels of air escaping from the vicinity of turbine blades.

The assembly for attaching the burr to the rotating assembly is also shown in FIG. 1. A first sleeve 53 is fixedly secured to the turbine unit and has an interior taper 54 along its inner surface, which results in a gradually reducing diameter from the bottom to the top of the sleeve. A second burr-receiving sleeve 55 is of a hollow cone-shape and has an outside taper 56 substantially matching, but of a progressively greater diameter than the taper 54. The sleeve has a plurality of slits 57 along its lower portion. When a burr is inserted into the sleeve 55 it frictionally engages the sleeve interior and the sleeve is progressively forced into engagement with sleeve 53. If the burr becomes lodged so tightly within the sleeve that it cannot be pulled out by hand, a rod or punch may be inserted through the air exhaust aperture in cap 15 to force the sleeve downwardly, which will loosen its grip on the burr. Inwardly extending flange 21 of the housing 12 creates a shoulder to retain sleeve 53 in the handpiece.

FIG. 2 shows another means of resiliently mounting a capsule within a capsule housing. The housing 60 is comprised generally of the cylindrical member 62 and the cap 63. The cap 63 is comprised of top 64 and the threaded flange 65. The cylindrical member 62 is tapered inwardly near its bottom at 66 and then merges with bottom 68 which has a centrally disposed burr-receiving opening 70.

The cylindrical member 62 is screw-threaded along its interior surface at its upper end 72 to mate with the exterior threads 74 on the flange 65 of cap 63. The flange 65 along its interior surface, has a taper 67, and the top 64 has an air exhaust port 76 centrally disposed therein.

The capsule consists of a cylindrical casing 80, closed at either end by the top and bottom bearing support members 82 and 84. The member 82 is an annular ring having a step 86 along its periphery to receive the casing 80, and a flange 88 extending upwardly from the ring's upper surface to form a seat for the upper ball bearing 90. The lower support member 84 is shown integral with the casing 80. Member 84 is an annular ring having a flange 92 extending downwardly from its lower surface to form a seat for the lower ball bearing 91.

In their opposed positions, the ring 82 and the flange 88 form a chamber with the taper 67 of the cap in which a resilient O-ring 94 is disposed. The ring 84 and its flange 92 form a chamber with the taper 66 in which a resilient O-ring 96 is disposed.

It can be seen that with the unit assembled as shown in FIG. 2 the only point of support between the capsule and the housing is through the O-rings 94 and 96. The degree of firmness in which the capsule may be held is also adjustable by the amount the cap 64 is threaded into the housing. It should also be noted that the ball bearings are of a conventional nature. Again, there is very little inwardly directed pressure against the ball bearing units.

Referring now to FIG. 3, there is shown another novel way of isolating the rotating elements from the handpiece housing. This structure takes advantage of the fast-moving air which is being expelled from the vicinity of the air turbine. The various elements in the FIG. 3 are not necessarily in capsule form, but may be arranged in the handpiece housing either individually or in capsule form.

The rotating structure is enclosed in an open-top housing 100 having a bottom 102 with a centrally disposed shaft-receiving opening 104. A burr shaft 106 is adapted to be removably mounted in a plastic sleeve 107 which is, in turn, mounted in sleeve 109 which is attached to turbine 110. The sleeve 109 is secured to lower ball bearing 112, upper ball bearing 114, and the air turbine 110. In this embodiment the bearings and the entire rotating mechanism are so dimensioned that, when assembled, they are spaced slightly from the housing 100 as shown at 101.

The outer race of the lower bearing is formed with an inwardly directed flange 116 which extends inwardly to partially block the normal exhaust air flow through the raceways of bearing 112. That portion of the air which normally would escape through the raceways will be partially deflected into space 101, and exhaust itself through the top and bottom of the housing. The speed and pressure of the air traveling through this space will form a film of compressed air which will support the entire rotating mechanism. It can be seen that the rotating mechanism will then have no metal-to-metal contact with the handpiece housing 100. This buffer zone aids greatly in reducing the noise which ordinarily develops between the casing and the rotating parts, and deadens any noise developing in the rotating parts themselves.

As shown in FIG. 3, neither of the outer races of the ball bearings is held in fixed relationship with the housing. However, either the upper or lower outer race can be held stationary while utilizing an air bearing for the other.

It can also be seen that with this structure, the rotating elements are not mounted to the housing in any critical position. This novel feature completely eliminates the alignment procedures which normally must be done in handpieces of this type.

As best seen in FIG. 4, a space 120 may also be provided between the burr shaft sleeve and the inner race of the bearings, if desired. This will produce a thin film of compressed air between the rotating shaft sleeve and the ball bearing units. When using this feature, space 101 may be retained as shown in FIG. 3, or the outer race may be secured to the casing. Again, one of the bearings may have its outer race secured to the housing if desired.

The FIG. 4 embodiment, then, teaches a rotating mechanism which utilizes air escaping from the turbine to produce an air bearing between the balls and the raceways, between the bearings and the housing, and also between the bearings and the rotating shaft. The raceways literally float in the compressed film of air that is developed in the confined escape paths of the air in the handpiece. To obtain the required amount of pressure to perform these functions, it is sometimes necessary to direct some of the air normally exhausted through the handle of the handpiece, to the bearing areas. Various methods of obtaining this pressure will be obvious to those skilled in the art.

In a general manner, while I have, in the above description, disclosed what I deem to be practical and efficient embodiments of my invention, it should be well understood that I do not wish to be limited thereto, as there might be changes made in the arrangement, disposition and form of the parts without departing from the principle of the present invention as comprehended within the scope of the accompanying claims.

I claim:

1. In a dental drilling machine, the combination including a generally cylindrical housing, air-operated rotor means within said housing provided with a shaft, anti-friction bearing means having inner and outer cylindrical races to support the shaft, said inner races being of slightly greater radial dimension than said shaft to provide clearance for lubricating air, means to supply air under pressure to operate said rotor means, and means to distribute a portion of said air to said clearance space.

2. The invention as defined in claim 1, wherein clearance space is also provided between the outer races and said housing, and means to distribute a portion of the air to said additional clearance space.

3. In a dental drilling machine, the combination including, a generally cylindrical housing with inwardly extending end walls, air-operated rotor means within said housing provided with a shaft, anti-friction bearing means having inner and outer cylindrical races to support the shaft, said outer races having a slight clearance radially and axially with respect to said housing for lubricating air, means to supply air under pressure to operate said rotor means, and means to distribute a portion of said air to said clearance space.

4. The invention as defined in claim 3, wherein at least one of said outer cylindrical races is provided with an inwardly directed flange.

References Cited in the file of this patent

UNITED STATES PATENTS

| | | |
|---|---|---|
| 2,756,115 | Michel | July 24, 1956 |
| 2,891,312 | Ellis | June 23, 1959 |
| 2,897,596 | Maurer | Aug. 4, 1959 |
| 2,945,299 | Fritz | July 19, 1960 |